(12) United States Patent
Miyoshi et al.

(10) Patent No.: US 8,414,203 B2
(45) Date of Patent: Apr. 9, 2013

(54) BARRIER DEVICE AND IMAGE PICKUP APPARATUS HAVING THE SAME

(75) Inventors: Kaori Miyoshi, Fuchu (JP); Shuichi Terada, Tokyo (JP)

(73) Assignee: Canon Kabushiki Kaisha (JP)

( * ) Notice: Subject to any disclaimer, the term of this patent is extended or adjusted under 35 U.S.C. 154(b) by 70 days.

(21) Appl. No.: 13/211,835

(22) Filed: Aug. 17, 2011

(65) Prior Publication Data

US 2012/0045198 A1 Feb. 23, 2012

(30) Foreign Application Priority Data

Aug. 18, 2010 (JP) .................................. 2010-183299

(51) Int. Cl.
*G03B 9/10* (2006.01)
(52) U.S. Cl.
USPC .......................................... 396/493; 396/452
(58) Field of Classification Search .................. 396/448, 396/449, 452, 454, 484, 488, 493
See application file for complete search history.

(56) References Cited

U.S. PATENT DOCUMENTS

2011/0052182 A1* 3/2011 Uchida et al. ................. 396/448

FOREIGN PATENT DOCUMENTS

| JP | H3-18519 H | 2/1991 |
| JP | 2007-102086 A | 4/2007 |

* cited by examiner

*Primary Examiner* — Clayton E LaBalle
*Assistant Examiner* — Warren K Fenwick
(74) *Attorney, Agent, or Firm* — Rossi, Kimms & McDowell LLP

(57) ABSTRACT

A barrier device in which excessive relative displacements of barrier blades in an optical axis direction are restricted to ensure a normal opening and closing operation of the barrier blades. The barrier device has second, first, and third barrier blades disposed in this order in the optical axis direction. Restriction portions of the first barrier blades have through portions extending from shielding portions in the optical axis direction and extending through elongated holes of the second barrier blades, and have extension portions extending parallel to the shielding portions from image-plane-side ends of the through portions and positioned on the image plane side of the second barrier blades. During the entire stroke of opening and closing of the barrier blades, the extension portions can be engaged with the shielding portions, whereby the second barrier blades are restricted from moving away from the first barrier blades.

7 Claims, 9 Drawing Sheets

BARRIER DEVICE AND IMAGE PICKUP APPARATUS HAVING THE SAME

BACKGROUND OF THE INVENTION

1. Field of the Invention

The present invention relates to a barrier device for opening and closing a front surface of an optical lens of optical equipment to protect the optical lens not in use, and relates to an image pickup apparatus having the barrier device.

2. Description of the Related Art

Conventionally, a barrier device for covering a front surface of an optical lens of optical equipment to protect the optical lens has been known and widely used for image pickup apparatuses such as a camera having a motor-driven retractable barrel.

Japanese Laid-open Utility Model Publication No. H3-18519 discloses an image pickup apparatus including a barrier device having barrier blades that are opened and closed to prevent a surface of an optical lens from being adhered with dust and stain and from being scratched (hereinafter, referred to as the first conventional barrier device). FIGS. 14 and 15 respectively show a fully closed state and a fully open state of the barrier blades of the first conventional barrier device. This barrier device includes a pair of barrier blades 202, 203 for openably covering a light incident opening 208a of a lens barrel 201.

With the progress of downsizing of image pickup apparatuses, lens barrels are demanded to be compact. However, if the lens barrel 201 of the first conventional barrier device is made small, there is a fear that outer peripheral portions 202a, 203a of the barrier blades 202, 203 extend beyond the lens barrel 201 when the barrier blades are fully opened, resulting in a poor appearance.

In this regard, a barrier device has been known in which the area of each barrier blade is reduced while increasing the number of barrier blades and disposing the blades so as to overlap one another in an optical axis direction, as disclosed in Japanese Laid-open Patent Publication No. 2007-102086 (hereinafter, referred to as the second conventional barrier device). In this barrier device, a retraction space for the barrier blades in the fully open state is made small, thereby realizing a reduction in lens barrel diameter. FIGS. 16 and 17 show the barrier blades of the second conventional barrier device in perspective view and in front view. This barrier device uses metallic barrier blades that can be formed to be thin, thereby suppressing the increase in blade thickness in the optical axis direction.

More specifically, the barrier device has barrier blade pairs 301, 302, and 303. The barrier blades 301 are formed with bent portions 301a bent in the optical axis direction, and the barrier blades 303 are formed with similar bent portions 303a. When the barrier blade pairs 301 to 303 move in the closing direction, the bent portions 301a of the barrier blades 301 drive the barrier blades 302, so that the barrier blades 302 move with a movement of the barrier blades 301. On the other hand, when the barrier blade pairs 301 to 303 move in the opening direction, the barrier blades 302 drive the bent portions 303a of the barrier blades 303, so that the barrier blades 303 move with a movement of the barrier blades 302.

Since the barrier device is generally provided at a tip end of the lens barrel, the barrier device is likely to suffer from large impact due to fall accident and likely to be applied with an external force provided by, e.g., a user by touching the barrier device. When applied with a large external force, there is a fear that the barrier blades are displaced relative to one another in the optical axis direction, resulting in gaps between the barrier blades being broadened.

In the second conventional barrier device, there is a case where the barrier blades 301, 302 are relatively displaced in the optical axis direction by an external force, so that gaps between the barrier blades are broadened. In that case, amounts of engagement of the bent portions 301a of the barrier blades 301 with the barrier blades 302 decrease. Thus, there is a fear that the bent portions 301a fail to properly drive the barrier blades 302, and the barrier blades 302 do not move with a movement of the barrier blades 301.

Also, there is a case where the barrier blades 301, 302 are largely displaced relative to each other in the optical axis direction by an external force, so that the bent portions 301a of the barrier blades 301 run on the barrier blades 302. In that case, the barrier blades 301 cannot return to a normal position, even if the external force is removed, resulting in an operation failure.

The above-described phenomena can also occur between the barrier blade 302 and the bent portion 303a of the barrier blade 303.

SUMMARY OF THE INVENTION

The present invention provides a barrier device and an image pickup apparatus having the same, which are capable of restricting excessive relative displacements of barrier blades in an optical axis direction to ensure a normal opening and closing operation of the barrier blades.

According to one aspect of the present invention, there is provided a barrier device, which comprises a plurality of barrier blades movable between an open position where the barrier blades open a light incident opening for an optical lens and a closed position where the barrier blades cover the light incident opening, the plurality of barrier blades at least including a first barrier blade and a second barrier blade disposed to overlap each other in an optical axis direction of the optical lens, and a restriction portion provided in the first barrier blade and configured for engagement with a portion of the second barrier blade opposite from the first barrier blade as viewed in the optical axis direction to restrict the second barrier blade from being moved away from the first barrier blade in the optical axis direction during an entire stroke of opening and closing of the plurality of barrier blades between the open position and the closed position.

According to the present invention, excessive relative displacements of the barrier blades in the optical axis direction can be suppressed to prevent a gap between the barrier blades in the optical axis direction from being excessively broadened, whereby a normal opening and closing operation of the barrier blades can be ensured.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1:
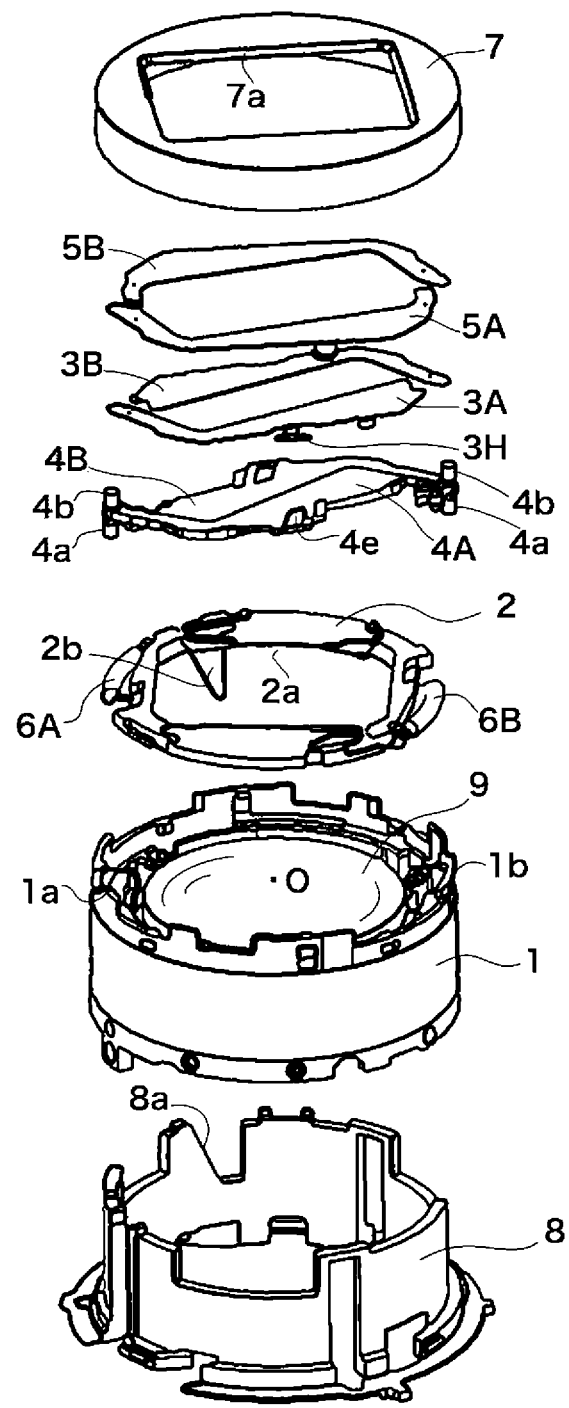
FIG. 1 is an exploded perspective view of a barrier device according to one embodiment of this invention.
Figure 13:
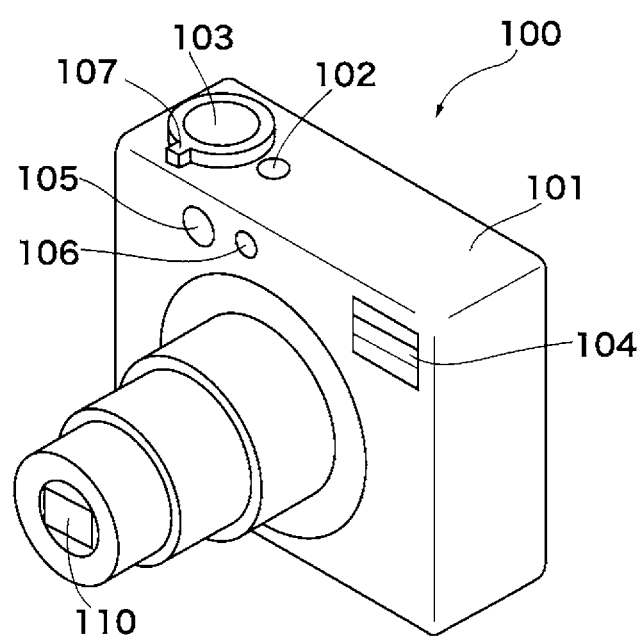
FIG. 13 is an external perspective view of an example of an image pickup apparatus on which the barrier device can be mounted.
Figure 14:
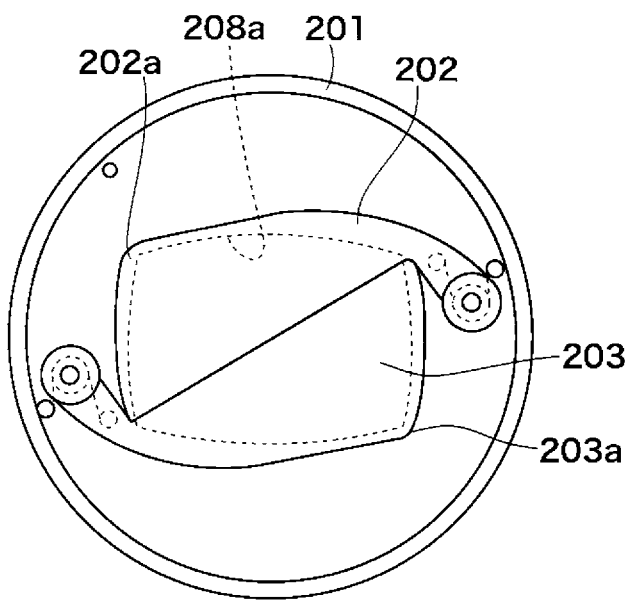
FIG. 14 is a view showing a first conventional barrier device in a state where barrier blades are fully closed.
Figure 15:
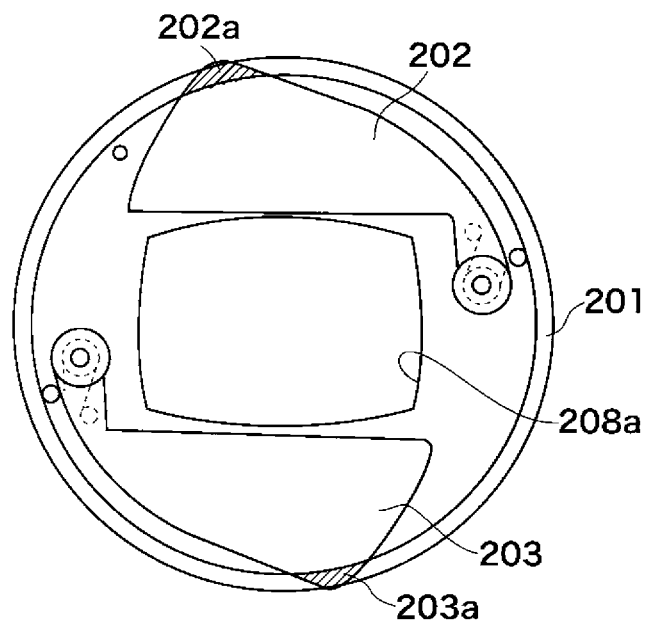
FIG. 15 is a view showing the first conventional barrier device in a state where the barrier blades are fully opened.
Figure 16:
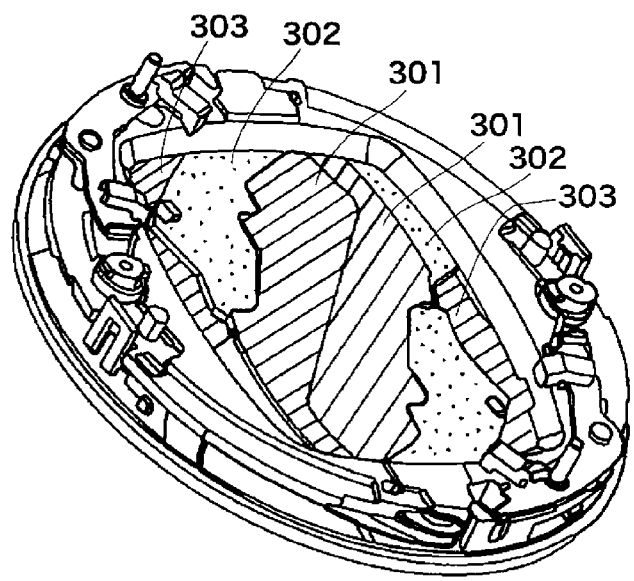
FIG. 16 is a perspective view showing a second conventional barrier device in a state where barrier blades are fully closed.
Figure 17:
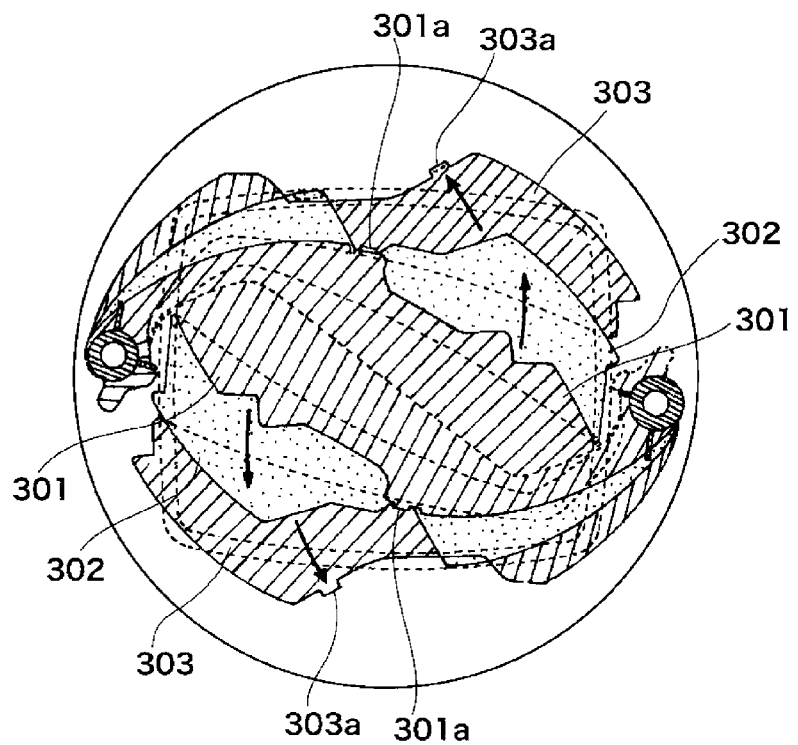
FIG. 17 is a front view showing the second conventional barrier device in a state where the barrier blades are fully closed.

FIG. 1 shows in exploded perspective view a barrier device according to one embodiment of this invention, and FIG. 13 shows in external perspective view an example image pickup apparatus that can be mounted with the barrier device. The following is a description of a compact digital camera that serves as the image pickup apparatus.

As shown in FIG. 13, the compact digital camera 100 has a camera body 101 mounted with a retractable lens barrel 110 on which the barrier device of this embodiment is mounted. On the camera body 101, there are disposed a main switch 102, photographing switch 103, and zoom lever 107.

The main switch 102 is for turning on/off power supply to the camera. The photographing switch 103 is half-pressed to perform a preparatory operation for photographing such as light measurement and distance measurement, and fully pressed to perform image photographing and recording. Reference numeral 105 denotes a light measurement device, 106 denotes a distance measurement device for measuring a distance to the object, and 104 denotes a flash device used for photographing in a dark environment. Although not shown, the camera body 101 incorporates therein an image pickup device (such as a CCD sensor or a CMOS sensor) for photoelectric conversion of an object image formed by a photographing optical system of the lens barrel 110.

As shown in FIG. 1, the barrier device includes a barrel frame 1, optical lens 9, and inner cylinder frame 8. The barrier device further includes a barrier drive ring 2, first to third pairs of barrier blades 3A, 3B; 4A, 4B; and 5A, 5B, a pair of urging members 6A, 6B, and barrier cover 7. Hereinafter, the first to third pairs of barrier blades will be referred to as the first to third barrier blades, respectively.

The first barrier blades 3A, 3B are disposed in point symmetry with respect to the optical axis center of the optical lens 9 and have the same shape as each other. This also applies to the second barrier blades 4A, 4B, third barrier blades 5A, 5B, and urging members 6A, 6B. Hereinafter and in the drawings, the first to third barrier blades and the urging members will be sometimes respectively denoted by reference numerals 3 to 6, with alphabetic symbols A and B omitted, unless they are distinguished from each other.

The barrier drive ring 2 is rotatably supported by the barrel frame 1 and formed with a light incident opening 2a through which incident light passes. The incident light propagates from the optical lens 9 to the image pickup device. As described later, the first to third barrier blades 3 to 5 are movable between an open position where they open the light incident opening 2a and a closed position where they cover the opening 2a.

Figure 2:
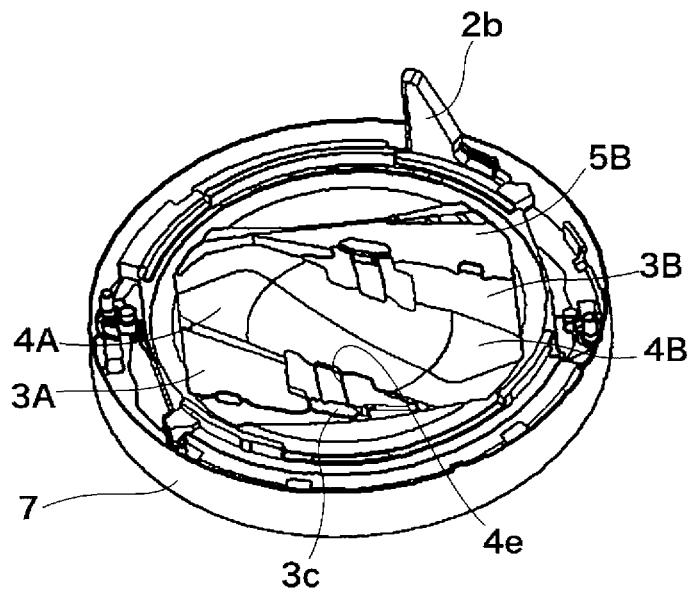
FIG. 2 is a perspective view showing a state where first to third barrier blades of the barrier device are fully closed and assume a closed position.
Figure 3:
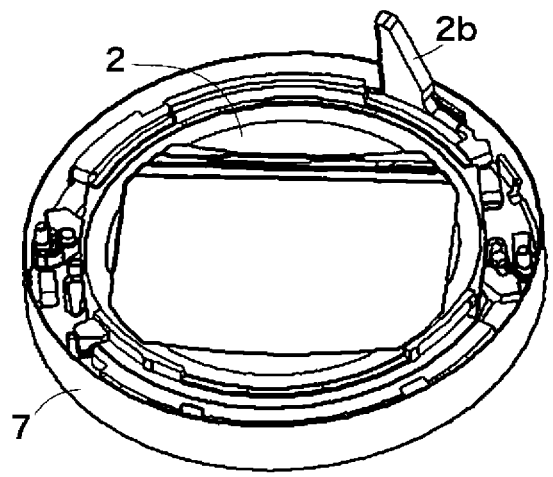
FIG. 3 is a perspective view showing a state where the first to third barrier blades of the barrier device are fully opened and assume an open position.
Figure 4:
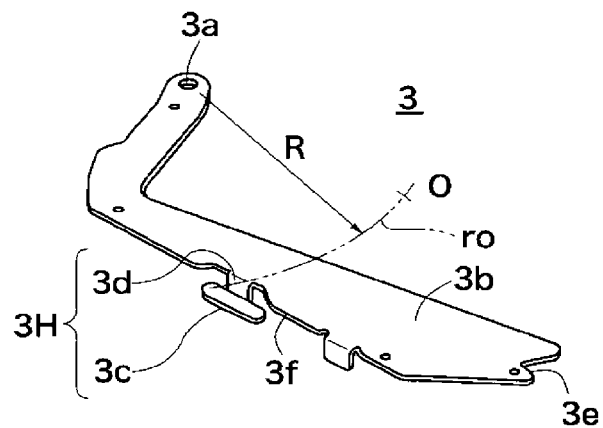
FIG. 4 is a perspective view showing one of the first barrier blades.
Figure 6:
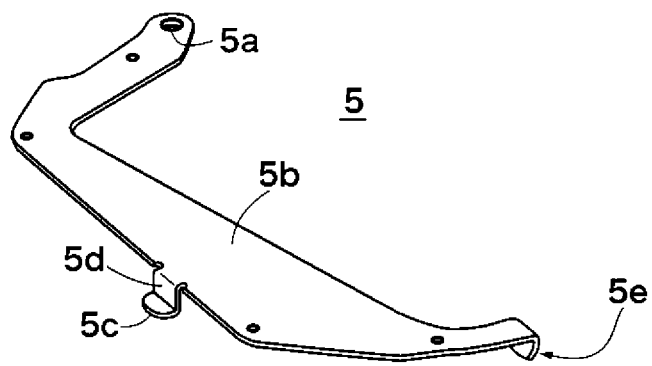
FIG. 6 is a perspective view showing one of the third barrier blades.
Figure 7:
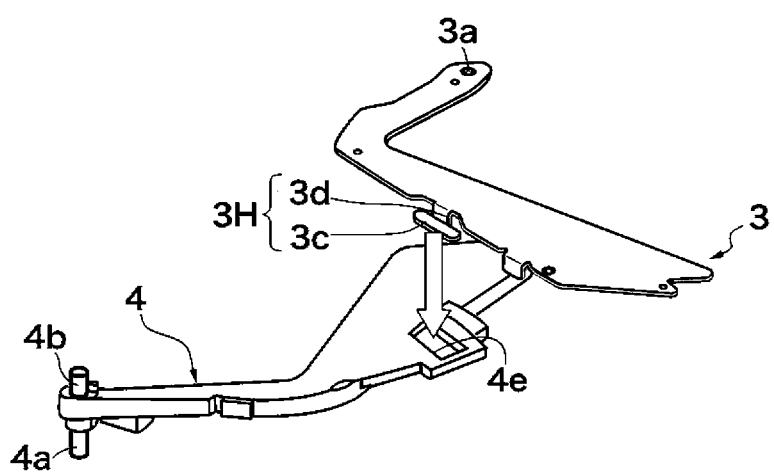
FIG. 7 is a perspective view showing a state where the first and second barrier blades are being assembled together.

FIG. 2 shows in perspective view the barrier device in a state where the barrier blades 3 to 5 are fully closed and assume the closed position, and FIG. 3 shows in perspective view the barrier device in a state where the barrier blades 3 to 5 are fully opened and assume the open position. FIGS. 4 to 6 respectively show the first to third barrier blades 3 to 5 in perspective view. FIG. 7 shows in perspective view a state where the first and second barrier blades 3, 4 are being assembled together.

It is assumed that an object to be photographed (not shown) is on an upper side in FIG. 1. Hereinafter, the object side and the side opposite from the object will sometimes be referred to as the front side and the image plane side where the image pickup device is disposed, respectively. The barrel frame 1 is disposed at a front end portion (on the object side) of the lens barrel 110. As shown in FIG. 1, the inner cylinder frame 8 is disposed inside the barrel frame 1, whereas a cam cylinder (not shown) is disposed outside the barrel frame 1. When the cam cylinder is rotated by a drive mechanism (not shown), the barrel frame 1 moves relative to the inner cylinder frame 8 in the optical axis direction along cam grooves formed in the cam cylinder, so that the lens barrel 110 is extended and retracted.

By means of the barrel frame 1, the optical lens 9 is held at the center of the barrel frame 1 and the barrier drive ring 2 is rotatably held at the outer periphery of the optical lens 9. The barrel frame 1 is formed with an arcuate hole through which a follower arm 2b formed on the barrier drive ring 2 extends and also formed with holes 1a, 1b by which the second barrier blades 4A, 4B are respectively held for rotation.

The barrier drive ring 2 is rotatably disposed about the optical axis. The follower arm 2b formed on the barrier drive ring 2 extends toward the image plane side in the optical axis direction. The barrier drive ring 2 is rotated by a slant surface of the follower arm 2b being brought in contact with a slant surface of an operation wall 8a of the inner cylinder frame 8. This operation will be described later.

The second barrier blades 4, first barrier blades 3, and third barrier blades 5 are disposed in this order as seen from the opposite side of the object (i.e., from the image plane side). The first to third barrier blades 3 to 5 have shielding portions 3b to 5b, respectively, which are flat plate portions extending perpendicular to the optical axis (FIGS. 4 to 6). Mainly by the shielding portions 3b to 5b, the light incident opening 2a through which light is incident into the optical lens 9 can be covered.

The first barrier blades 3 are each made of a thin metal plate. As shown in FIG. 4, a hole 3a serving as a rotation center is formed in the shielding portion 3b of each of the first barrier blades 3. The first barrier blades 3 are rotatably supported by shafts 4b of the second barrier blades 4 extending through the holes 3a, so that the first barrier blades are rotatable about the holes 3a in opening and closing directions between an open position and a close position where they cover a part of the light incident opening 2a. The first barrier blades 3 each have a restriction portion 3H formed into a hook shape and having a through portion 3d and an extension portion 3c.

As shown in FIGS. 4 and 7, the through portion 3d of the restriction portion 3H extends from an outer edge of the shielding portion 3b toward the image plane side (i.e., toward a lower side in FIG. 4) in the optical axis direction, while extending through an elongated hole (opening) 4e of the second barrier blade 4. The extension portion 3c extends from an image-plane-side end of the through portion 3d in parallel to the shielding portion 3b, while forming an angle of 90 degrees with the through portion 3d. A distance from the hole 3a to the restriction portion 3H is nearly equal to a distance R from the hole 3a to the optical center O of the optical lens 9. As viewed in plan, the restriction portion 3H is provided at or slightly outside a position passed by a circle ro centered on the hole 3a and having a radius R that has a length from the hole 3a to the optical axis center O. The reason why the extension portion 3c is provided at such a position will be described later together with a description of operations of the barrier blades.

The first barrier blades 3 each have a notch portion 3e and a pressing portion 3f which are formed at an end and the outer edge of the shielding portion 3b and by which a corresponding one of the third barrier blades 5 is driven in the opening and closing directions.

Figure 5A:
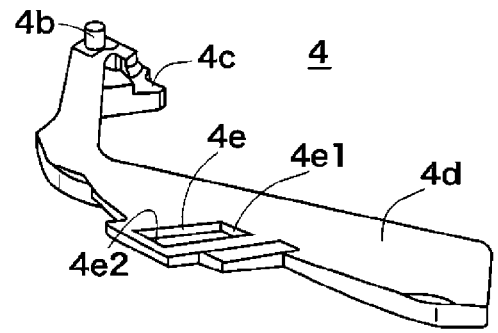
FIGS. 5A and 5B are perspective views showing one of the second barrier blades.
Figure 5B:
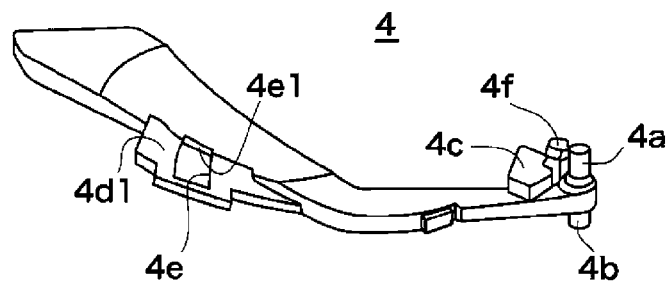

FIGS. 5A and 5B are perspective views showing one of the second barrier blades 4 as obliquely seen from the object side and as obliquely from the image plane side, respectively. The second barrier blades 4 are resin molded products and each have shafts 4a, 4b respectively extending toward the image plane side and toward the object side and formed coaxially with each other. The shafts 4a of the second barrier blades 4 are inserted into the holes 1a, 1b (FIG. 1) of the barrel frame 1, whereby the second barrier blades 4 are supported by the barrel frame 1 for rotation around the shafts 4a so as to be movable between the closed position and the open position.

The shafts 4b of the second barrier blades 4 extend through the holes 3a of the first barrier blades 3 and through holes 5a (FIG. 6) of the third barrier blades 5, and support the first and third barrier blades 3, 5 for rotation in the opening and closing directions.

Each of the second barrier blades 4 is further provided at near the shafts 4a, 4b with a projection portion 4c and provided with a spring hook portion 4f contiguous to the projection portion 4c.

The shielding portion 4d of each second barrier blade 4 is formed with the elongated hole 4e as previously described. The elongated hole 4e is extended in the direction in which the second barrier blade 4 is rotated to be opened and closed. Reference numeral 4e1 denotes a first wall portion that defines an inner end edge of the elongated hole 4e, and 4e2 denotes a second wall portion that defines an outer end edge of the elongated hole 4e. A distance from the axial center of the shaft 4b to the elongated hole 4e is nearly equal to the radius R of the circle ro shown in FIG. 4, so that the elongated hole 4e is aligned in position with the restriction portion 3H. The through portion 3d of the restriction portion 3H extends through the elongated hole 4e, and the extension portion 3c of the restriction portion 3H is positioned on the rear side (or the image plane side) of the elongated hole 4e. Thus, the extension portion 3c can be in contact and engagement with an image-plane-side rear surface 4d1 of the shielding portion 4d during the entire stroke of opening and closing of the barrier blades.

The extension portion 3c of the restriction portion 3H is extended in the radius direction of the circle ro, whereas the elongated hole 4e of the second barrier blade 4 is extended in the circumference direction of the circle ro. To assemble the first and second barrier blades 3, 4 together, these blades 3, 4 are temporarily placed in an orthogonal state as shown in FIG. 7. In that state, the extension portion 3c is inserted through the elongated hole 4e, thereby engaging the restriction portion 3H with the elongated hole 4e. Next, the first and second barrier blades 3, 4 are relatively rotated such that the hole 3a of the first barrier blade 3 is aligned in position with the shaft 4b of the second barrier blade 4. Then, the shaft 4b is inserted and fitted into the hole 3a.

As a result, the longitudinal axis of the extension portion 3c extends perpendicular to that of the elongated hole 4e, and the extension portion 3c becomes undetachable from the elongated hole 4e. In other words, after the first and second barrier blades 3, 4 are assembled together, the extension portion 3c becomes undetachable from the elongated hole 4e. After the assembly, a portion of the shielding portion 4d around the elongated hole 4e is sandwiched (in the optical axis direction) between the extension portion 3c and a part of the shielding portion 3b near the restriction portion 3H. Accordingly, even if the first barrier blade 3 is applied with a force exerting to move the first barrier blade 3 away from the second barrier blade 4 in the optical axis direction, an excessive displacement of the first barrier blade 3 is restricted by the extension portion 3c being brought in contact and engagement with the rear surface 4d1 of the shielding portion 4d.

When the second barrier blade 4 assembled as described above is rotatively moved, the through portion 3d of the first barrier blade 3 is brought in contact with and driven by the first or second wall portion 4e1 or 4e2. Thus, with the movement of the second barrier blade 4, the first barrier blade 3 moves in the closing or opening direction. The details will be described later.

Referring to FIG. 6, each of the third barrier blades 5 made of a thin metal plate has the shielding portion 5b formed with the hole 5a as previously described. The third barrier blade 5 is supported by the shaft 4b of the second barrier blade 4, which extends through the hole 5a and the hole 3a of the first barrier blade 3, for rotation about the hole 5a in the opening and closing directions between an open position and a close position where the third barrier blade 5 covers a part of the light incident opening 2a.

There is provided a bent portion 5d extending from the outer edge of the shielding portion 5b toward the image plane side (i.e., toward the lower side in FIG. 6) in the optical axis direction. A hook portion 5c extends outwardly from an image-plane-side end of the bent portion 5d, while forming an angle of 90 degrees with the bent portion 5d. In other words, the hook portion 5c extends parallel to the shielding portion 5b.

The shielding portion 5b is formed with a U-shaped hook portion 5e at a position remotest from the hole 5a. The U-shaped hook portion 5e is bent at 90 degrees relative to the shielding portion 5b and further bent inwardly at several tens degrees, whereby the hook portion 5e is formed into substantially a U-shape.

When brought in contact with the bent portions 5d and U-shaped hook portions 5e, the pressing portions 3f and notch portions 3e of the first barrier blades 3 respectively drive the portions 5d, 5e. Thus, the third barrier blades 5 move in the opening and closing directions with a movement of the first barrier blades 3. The details will be described later.

During the opening stroke, the notch portions 3e are guided for contact with inner sides of the U-shaped hook portions 5e. The barrier device having the U-shaped hook portions 5e is strong enough in construction to withstand an external force, if applied, from the object side when the barrier device is in the closed state (i.e., when the camera is in the power-off state). For example, even if the barrier blades are pressed by the user, the first barrier blades 3 can remain in contact with the U-shaped hook portions 5e.

Figure 8:
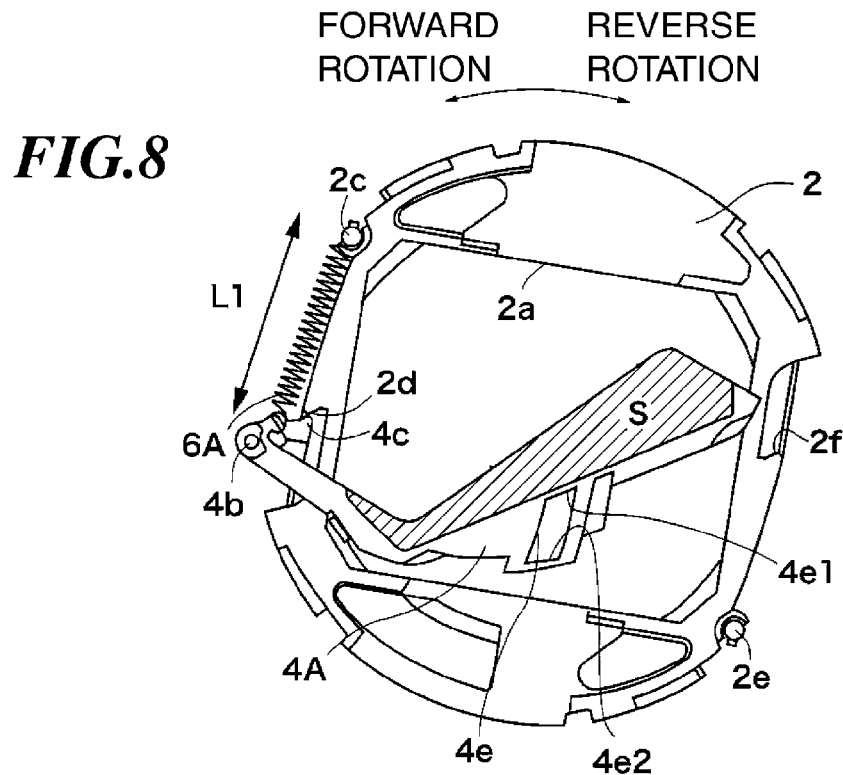
FIG. 8 is a view showing the barrier device as seen from the object side in a state where the first to third barrier blades are in the closed position.
Figure 9:
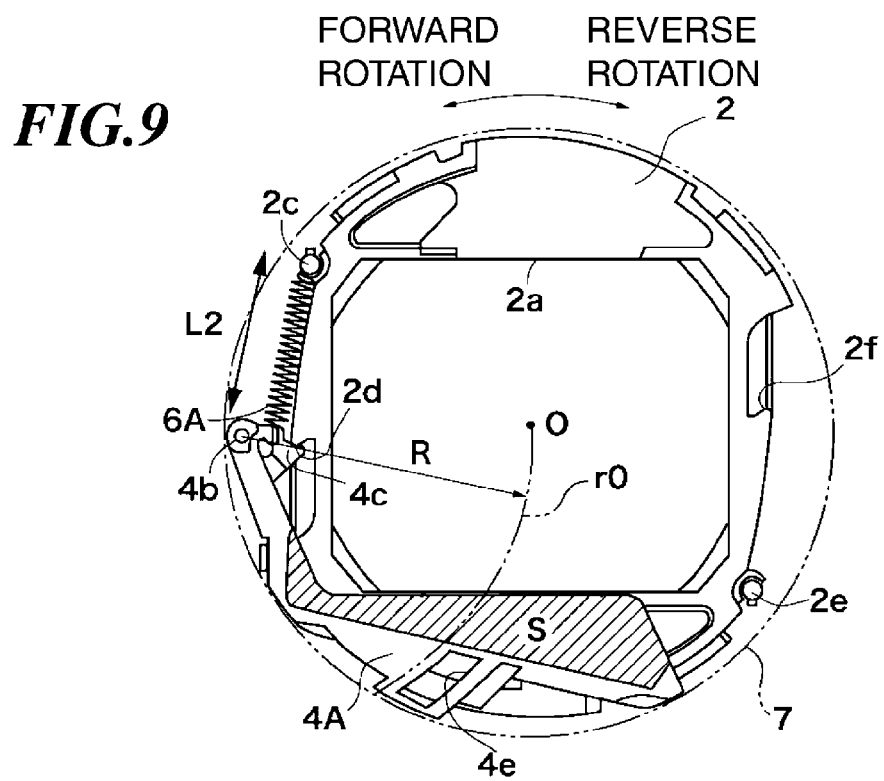
FIG. 9 is a view showing the barrier device as seen from the object side in a state where the first to third barrier blades are in the open position.

FIGS. 8 to 12 show how the barrier blades 3 to 5 are driven to open and close. In FIGS. 8 and 9, the barrier device is shown as seen from the object side in states where the barrier blades 3 to 5 are in the closed position and where the barrier blades 3 to 5 are in the open position.

As shown in FIG. 8, at the outer periphery of the barrier drive ring 2, there are provided shafts 2c, 2e for being engaged with urging members 6A, 6B (e.g., springs) and contact portions 2d, 2f for driving the second barrier blades 4A, 4B. The urging members 6A, 6B which are always in a tension state are stretched between the spring hook portions 4f (FIG. 5B) and the shaft portions 2c, 2e. In FIG. 8, only the urging member 6A is shown.

The spring hook portion 4f (FIG. 5B) is disposed closer to the optical axis center O than the shaft 4b. When the follower arm 2b of the barrier drive ring 2 is out of contact with the operation wall 8a of the inner cylinder frame 8, the barrier drive ring 2 is urged in a forward rotation direction by an urging force of the urging member 6. As a result, the projection portions 4c of the second barrier blades 4 are always in contact with the contact portions 2d, 2f (FIG. 8) of the barrier drive ring 2. The details of an opening and closing operation of the barrier drive ring 2 will be described later.

If the barrier drive ring 2 is rotated forwardly (i.e., counterclockwise in FIG. 8) when the second barrier blades 4 are in the closed position (FIG. 8), the contact portions 2d, 2f drive the projection portions 4c of the second barrier blades 4A, 4B. Thus, with the rotation of the barrier drive ring 2, the second barrier blades 4 are rotatively driven about the shafts 4a in the opening direction and move to the opening position (FIG. 9).

Figure 10:
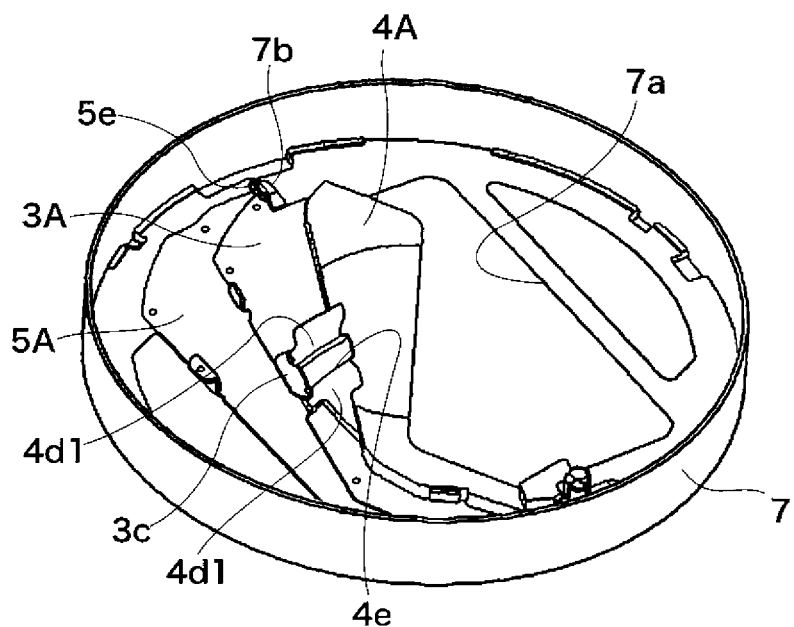
FIG. 10 is a perspective view of a barrier cover of the barrier device as obliquely seen from the image plane side.

FIG. 10 shows in perspective view the barrier cover 7 as obliquely seen from the image plane side. A rectangular opening 7a through which effective light flux passes is formed at a central part of the barrier cover 7. The barrier cover 7 is disposed at a frontmost end of the lens barrel 110 and fixed to the barrel frame 1 to protect the barrier blades 3 to 5.

As shown in FIG. 10, projection portions 7b are provided on an image-plane-side surface of the barrier cover 7. The projection portions 7b are in contact with the U-shaped hook portions 5e of the third barrier blades 5 which are in the closed position. When the U-shaped hook portions 5e are in contact with the projection portions 7b, the third barrier blades 5 assume move limit positions in the closing direction, whereby a further movement is prevented.

Figure 11:
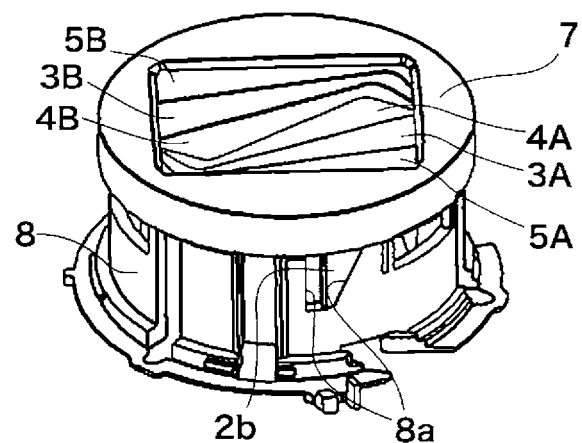
FIG. 11 is a perspective view showing a lens barrel of the barrier device in a state where the first to third barrier blades are in the closed position.
Figure 12:
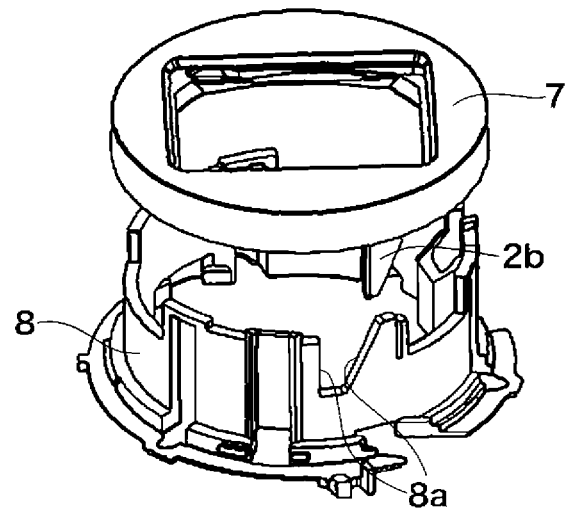
FIG. 12 is a perspective view showing the lens barrel in a state where the first to third barrier blades are in the open position.

Next, with reference to FIGS. 8 to 12, a description will be given of operation of the barrier device of this embodiment. FIGS. 11 and 12 respectively show in perspective view the lens barrel 110 in states where the barrier blades 3 to 5 are in the closed position and in the open position, with an illustration of the barrel frame 1 omitted.

When the camera is in a power-off state, the lens barrel 110 is in a retracted (stored) state and the barrier blades 3 to 5 are in the closed state shown in FIG. 11. When the main switch 102 of the camera body 101 is turned on, the lens barrel 110 is extended by a drive mechanism (not shown) relative to the inner cylinder frame 8 toward the object side in the optical axis direction.

In the power-off state, the inner cylinder frame 8 and the barrel frame 1 become closest to each other, and the slant surface of the follower arm 2b of the barrier drive ring 2 is in contact with the slant surface of the operation wall 8a as shown in FIG. 11. When the power is turned on and the barrel frame 1 is extended, the follower arm 2b moves away from the operation wall 8a while increasing a relative distance between the inner cylinder frame 8 and the barrel frame 1, and becomes a free state as shown in FIG. 12.

Next, with reference to FIGS. 8 and 9, a description is given of operations of the barrier drive ring 2, urging members 6, and second barrier blades 4. In FIGS. 8 and 9, illustrations of component parts unnecessary for the description are omitted, and symbol S denotes an exposed portion of one of the second barrier blades 4. In the power-off state (i.e., when the barrier blades are in the closed state) shown in FIG. 8, the exposed portions S are exposed to the outside, but regions of the second barrier blades 4 other than the exposed portions S are not exposed to the outside.

In a state where the inner cylinder frame 8 and the barrel frame 1 become closest to each other, the follower arm 2b is in contact and engagement with the slant surface of the operation wall 8a against the urging forces of the urging members 6, and becomes closest to a perpendicular surface of the operation wall 8a. In other words, the barrier drive ring 2 is in the closed state shown in FIG. 8.

When the barrel frame 1 is extended by the drive mechanism (not shown) from the closed state shown in FIG. 8, the barrier drive ring 2 is rotated forwardly or anticlockwise by the urging forces of the urging members 6. Thus, the follower arm 2b moves away from the perpendicular surface of the operation wall 8a, while slidingly moving along the slant surface of the operation wall 8a, and the barrier drive ring 2 becomes a free state. At that time, lengths of the urging members 6 (i.e., distances between the shaft portions 2c, 2e and the spring hook portions 4f) decrease from L1 shown in FIGS. 8 to L2 shown in FIG. 9.

Since the barrier drive ring 2 has the contact portions 2d that are in contact with the projection portions 4c of the second barrier blades 4, the second barrier blades 4 forwardly rotate in the opening direction (or in the clockwise direction) with forward rotation of the barrier drive ring 2. Subsequently, the second barrier blades 4 forwardly rotate up to a retraction position where the blades 4 are retracted from the light incident opening 2a. At the retraction position, the second barrier blades 4 are in contact with stoppers (not shown) and stop rotating. Such state is shown in FIG. 9.

Next, a description will be given of how the first and third barrier blades 3, 5 are rotatively moved with the rotational movement of the second barrier blades 4.

As previously described, the forward rotation of the second barrier blades 4 is started from the closed position shown in FIG. 8. In an initial stage of the forward rotation, the first and third barrier blades 3, 5 are in the closed position. Subsequently, with the forward rotation of the second barrier blades 4, the first wall portions 4e1 that define the inner end edges of the elongated holes 4e of the blades 4 are brought in contact with the through portions 3d (FIG. 4) of the restriction portions 3H of the first barrier blades 3. With further rotation of the second barrier blades 4 in the opening direction, the through portions 3d are driven by the first wall portions 4e1 of the blades 4, so that the first barrier blades 3 are rotated in the opening direction.

With further rotation of the first and second barrier blades 3, 4 in the opening direction, the pressing portions 3f (FIG. 4) of the first barrier blades 3 are brought in contact with the bent portions 5d (FIG. 6) of the third barrier blades 5. With further rotation of the first and second barrier blades 3, 4 in the opening direction, the bent portions 5d are driven by the pressing portions 3f, so that the third barrier blades 5 are rotated in the opening direction.

As described above, the first to third barrier blades 3 to 5 are rotatively moved in the opening direction. When the second barrier blades 4 are brought in contact with the stoppers and stop rotating (FIG. 9), the first and third barrier blades 3, 5 also stop rotating. As a result, the barrier open state shown in FIGS. 3, 9, and 12 is attained.

Next, a shift operation from the barrier open state to the barrier closed state will be described in detail.

When the power is turned off in the extended state of the barrel frame 1 (e.g., FIGS. 9 and 12), the barrel frame 1 starts to move toward the image plane side in the optical axis direction. As a result, a relative distance between the barrel frame 1 and the inner cylinder frame 8 decreases, and the slant surface of the follower arm 2b starts to be in contact with the slant surface of the operation wall 8a of the inner cylinder frame 8. With further decrease in the distance between the barrel frame 1 and the inner cylinder frame 8, the follower arm 2b slidably moves along the slant surface of the operation wall 8a. Thus, the barrier drive ring 2 rotates reversely (i.e., clockwise in FIGS. 9 and 12) against the urging forces of the urging members 6.

With the reverse rotation of the barrier drive ring 2, the contact portions 2d, 2f of the drive ring 2 attempt to move away from the projection portions 4c. However, such movement is prevented by the urging forces of the urging members 6. Thus, the second barrier blades 4 start to reversely rotate and rotatively move in the closing direction.

In an initial stage of the movement of the second barrier blades 4, the first and third barrier blades 3, 5 are in the open position. With rotation of the second barrier blades 4 in the closing direction, the second wall portions 4e2 that define the outer end edges of the elongated holes 4e are brought in contact with the through portions 3d of the first barrier blades 3. With further rotation of the second barrier blades 4 in the closing direction, the through portions 3d are driven by the second wall portions 4e2, so that the first barrier blades 3 are rotated in the closing direction.

With the rotation of the first and second barrier blades 3, 4 in the closing direction, the notch portions 3e of the first barrier blades 3 are brought in contact with the U-shaped hook portions 5e of the third barrier blades 5. With further rotation of the first and second barrier blades 3, 4 in the closing direction, the U-shaped hook portions 5e are driven by the notch portions 3e, so that the third barrier blades 5 are rotated in the closing direction.

As described above, the first to third barrier blades 3 to 5 are rotatively moved in the closing direction. When the two second barrier blades 4A, 4B are brought in contact with each other, the second barrier blades 4 stop rotating.

Concurrently, the third barrier blades 5 stop rotating when the U-shaped hook portions 5e are brought in contact with the projection portions 7b (FIG. 10) of the barrier cover 7, and the first barrier blades 3 stop rotating when the notch portions 3e are brought in contact through the U-shaped hook portions 5e with the projection portions 7b. As a result, the barrier closed state shown in FIGS. 2, 8, and 11 is attained, so that the light incident opening 2a is covered by the first to third barrier blades 3 to 5, whereby the optical lens 9 is protected.

As described above, various parts of the barrier device are properly in contact and engagement with one another, whereby the first and second barrier blades 3, 5 can be rotatively moved with the rotation of the second barrier blades 4.

The following is a description of a case where the camera is applied with an impact force by which the barrier blades are relatively displaced in the optical axis direction.

It is assumed, for example, that an external force by which the first barrier blades 3 are excessively displaced is applied. The barrier device of this embodiment is configured that a portion of each second barrier blade 4 around the elongated hole 4e is sandwiched (in the optical axis direction) between the shielding portion 3b of the first barrier blade 3 and the extension portion 3c of the restriction portion 3H. In other words, the extension portion 3c is prevented from being detached in the optical axis direction from the elongated hole 4e of the second barrier blade 4. Accordingly, even if an external force acting to excessively displace the first barrier blades 3 is applied, engagement between the through portions 3d of the first barrier blades 3 and the first or second wall portions 4e1 or 4e2 of the second barrier blades 4 is maintained. It is therefore ensured that the first barrier blades 3 can rotate with rotation of the second barrier blades 4, whereby the barrier device is enabled to perform the opening and closing operation.

In order to permit the first barrier blades 3 to run idle so as not to immediately rotate with rotation of the second barrier blades 4 in an initial stage of rotation of the second barrier blades 4 in the opening and closing direction, the barrier device of this embodiment has the elongated holes 4e formed in the second barrier blades 4 and having a long length in the circumferential direction. However, the provision of such elongated holes requires a large space. Accordingly, in this embodiment, the elongated holes 4e are each formed, as viewed in plan, on or near the circle ro having a radius equal to the distance R from the hole 3a to the optical axis center O of the optical lens 9.

To make the elongated holes 4e of the second barrier blades 4 as longer as possible (FIG. 9) and make the elongated holes 4e invisible from the outside in a barrier fully open state, the elongated holes 4e must be formed in regions other than the exposed portions S of the second barrier blades 4 and located inside the outer peripheral edge of the barrier cover 7. To this end, in this embodiment, the elongated holes 4e are each formed at or slightly outside the circle ro (FIG. 9) as viewed in plan. As a result, spaces for formation of the elongated holes 4e in the second barrier blades 4 can be efficiently ensured and the lengths of the elongated holes 4e can be made longer, whereby the second barrier blades 4 with long elongated holes 4e can be mounted without the need of increasing the size of the barrel frame 1.

According to this embodiment, the extension portions 3c of the restriction portions 3H of the first barrier blades 3 are located on the side of the rear surfaces 4d1 of the second barrier blades 4 for engagement with the rear surfaces 4d1. As a result, in the entire stroke of opening and closing of the second barrier blades 4, the second barrier blades 4 are prevented from being moved excessively away from the first barrier blades 3 in the optical axis direction. In other words, excessive relative displacements of the first and second barrier blades 3, 4 are restricted, so that gaps between these barrier blades are not excessively broadened, whereby a normal opening and closing operation of the barrier blades 3, 4 can be ensured. The restriction portions 3H which are of hook type can withstand an external force.

Since an amount of relative displacements of the first and second barrier blades 3, 4 always falls within a proper range, the extension portions 3c do not run on the shielding portions 4d of the second barrier blade 4, so that a normal opening and closing operation of the barrier blades can be ensured for a long time.

Since the through portions 3d of the restriction portions 3H extend through the elongated holes 4e and since the extension portions 3c are located on the image-plane side of the elongated holes 4e and not detached from the elongated holes 4e, the mechanism by which a separation movement of the first and second barrier blades 3, 4 (i.e., a relative movement away from each other) is restricted can be prevented from becoming excessively large in size. Since the first barrier blades 3 rotate with rotation of the second barrier blades 4 by the engagement between the through portions 3d of the restriction portions 3H and the first and second wall portions 4e1, 4e2 defining the inner and outer end edges of the elongated holes 4e, the restriction portions 3H and the elongated holes 4e not only serve as the mechanism for restricting a separation movement of barrier blades, but also serve as the mechanism for enabling barrier blades to rotate with rotation of other barrier blades. This contributes to downsizing the barrier device.

Since the regions of the second barrier blades 4 where the elongated holes 4e are formed are not exposed to the outside during the entire stroke of opening and closing and since the positions where the restriction portions 3H are provided are at or slightly outside (as viewed in plan) the positions passed by the circles ro centered on the holes 3a and each having the radius R, degradation of external appearance can be prevented while avoiding the increase in the size of the elongated holes 4e and the restriction portions 3H.

From the viewpoint of preventing external appearance degradation while avoiding the increase in the size of the restriction portions 3H and the elongated holes 4e, the restriction portions 3H and the elongated holes 4e can be provided outside the circles ro as viewed in plan. Depending on the design of the barrier blades, the restriction portions 3H and the elongated holes 4e can be provided at near the tip ends of the first and second barrier blades 3, 4. However, it is preferable that the restriction portions 3H be provided on the circles ro or at near the circles ro between the circles ro and the tip ends of the first barrier blades 3 in the radial direction of the circles ro (i.e., slightly outside the circles ro). It is also preferable that the elongated holes 4e be provided on the circles ro or at near the circles ro between the circles ro and the tip ends of the second barrier blades 4 in the radial direction of the circles ro (i.e., slightly outside the circles ro).

In this embodiment, as the mechanism for restricting the separation movement of the first and second barrier blades 3, 4, the restriction portions 3H are provided in the first barrier blades 3 and the elongated holes 4e are provided in the second barrier blades 4. Alternatively, the restriction portions 3H can be provided in the second barrier blades 4 and the elongated holes 4e can be provided in the first barrier blades 3. It is also preferable that a mechanism for restricting a separation movement of barrier blades be provided between the second and third barrier blades 4, 5. In the following, the reason why such a mechanism is preferably provided between the second and third barrier blades 4, 5 will be described.

It is assumed, for example, that the second and third barrier blades 4, 5 are displaced by an external force relative to one another in the optical axis direction by a distance that exceeds the length of the bent portions 5d. In that state, if the barrier device attempts to make a shift from the closed state to the open state, there is a possibility that since the second and third barrier blades 4, 5 are displaced from a normal position, the pressing portions 3f of the first barrier blades 3 forwardly rotating with forward rotation of the second barrier blades 4 are not brought in contact with the bent portions 5d, so that the third barrier blades 5 cannot rotate. As a result, the barrier device cannot make a shift to the open state. In another case where the third barrier blades 5 are displaced by an external force from a normal position such that the hook portions 5c run on the shielding portions 3b of the first barrier blades 3, the hook portions 5c are sandwiched between the first and second barrier blades 4, 5. As a result, the third barrier blades 5 cannot return to the normal position when the external force is removed, so that the barrier device becomes inoperable. Such inconvenience can be eliminated by providing, between the second and third barrier blades 4, 5, a mechanism for restricting a separation movement of the barrier blades 4, 5.

In the above-described embodiment, the restriction portions 3H are configured that the through portions 3d extend toward the image plane side and the extension portions 3c are positioned on the image-plane side of the second barrier blades 4. However, in the case of two barrier blades disposed in an order reverse to that in which the barrier blades 3, 4 are disposed, it is possible to configure the restriction portions such that the through portions extend from one of the barrier blades toward the object side and the extension portions are positioned on the object side of another barrier blade.

The mechanism for restricting a separation movement of two barrier blades can be provided between at least one set of barrier blades (i.e., between at least two barrier blades), among one set or plural sets of barrier blades (where each set of barrier blades are comprised of two adjacent barrier blades). For example, in the case of a barrier device having two or more sets of barrier blades (i.e., having three or more barrier blades), mechanisms each for restricting a separation movement of barrier blades can be provided for at least two sets of barrier blades.

The barrier device of the above-described embodiment has plural pairs of barrier blades and each pair of blades are disposed in point symmetry with respect to the optical axis center, but these are not limitative. This invention is applicable to any barrier device having a plurality of barrier blades at least including a first barrier blade and a second barrier blade.

The restriction portions 3H are each formed into a hook shape, but this is not limitative. The restriction portion can be formed into any shape as long as the restriction portion provided in one of barrier blades is disposed for engagement with an opposite side portion of another barrier blade as viewed in the optical axis direction, so as to restrict a movement of the other barrier blade away from the one barrier blade in the optical axis direction.

From the viewpoint of preventing upsizing of the mechanism that restricts a separation movement of two barrier blades, it is enough that the extension portion 3c and the elongated hole 4e are formed into shapes (as viewed in plan) that prevent the extension portions 3c from being detached from the elongated holes 4e. In other words, the shapes in the illustrated example are not limitative.

The elongated hole 4e with which the restriction portion 3H is engaged may not be a complete circle, but may be an opening. For example, the elongated hole 4e may be an opening which is equivalent to the elongated hole and which opens to the outer peripheral edge of the shielding portion 4d.

In the above-described embodiment, the extension portions 3c that constitute the mechanism for restricting separation movement of two barrier blades are formed integrally with the through portions 3d that constitute the mechanism for rotatively moving the first barrier blade 3 with rotation of the second barrier blade 4. However, these mechanisms can be formed separately or can be individually provided at different places.

Only from the viewpoint of restricting excessive relative displacements of barrier blades in the optical axis direction to ensure a normal opening and closing operation of the barrier blades, a movement between adjacent barrier blades is not limited to a rotational movement, but may be a parallel sliding movement or may be a combination of parallel movement and rotational movement.

The material constituting the barrier blades is not limitative. The barrier blades can be formed by metal plates or resin mold or any other materials.

In the above-described embodiment, a compact digital camera has been described as an example image pickup apparatus to which the barrier device is applied, but this is not limitative. The present invention is applicable to various apparatuses having an optical lens, such as a video camera and other equipment mounted with an optical lens.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2010-183299, filed Aug. 18, 2010, which is hereby incorporated by reference herein in its entirety.

What is claimed is:

1. A barrier device comprising:
a plurality of barrier blades movable between an open position where said barrier blades open a light incident opening for an optical lens and a closed position where said barrier blades cover the light incident opening, said plurality of barrier blades at least including a first barrier blade and a second barrier blade disposed to overlap each other in an optical axis direction of the optical lens; and
a restriction portion provided in said first barrier blade and configured for engagement with a portion of said second barrier blade opposite from said first barrier blade as viewed in the optical axis direction to restrict said second barrier blade from being moved away from said first barrier blade in the optical axis direction during an entire stroke of opening and closing of said plurality of barrier blades between the open position and the closed position.

2. The barrier device according to claim 1, wherein said plurality of barrier blades each have a plate portion extending in a direction perpendicular to the optical axis direction,
said second barrier blade is formed with an opening,
said restriction portion of said first barrier blade is formed into a hook shape and having a through portion and an extension portion that extends from the extension portion, said through portion extending from the plate portion of said first barrier blade in the optical axis direction and extending through the opening of said second barrier blade, and
the plate portion of said second barrier blade is disposed between the plate portion of said first barrier blade and the extension portion of said first barrier blade in the optical axis direction.

3. The barrier device according to claim 2, wherein the opening of said second barrier blade and the extension portion of said restriction portion of said first barrier blade are formed into shapes, as viewed in plan, that prevent the extension portion from being detached from the opening during the entire stroke of opening and closing of said plurality of barrier blades.

4. The barrier device according to claim 2, wherein said first barrier blade moves with a movement of said the second barrier blade by engagement between the through portion of said restriction portion of said first barrier blade and the opening of said second barrier blade.

5. The barrier device according to claim 2, wherein the opening of said second barrier blade is formed in a region of said second barrier blade which is not exposed during the entire stroke of opening and closing of said plurality of barrier blades.

6. The barrier device according to claim 1, wherein said first barrier blade is configured to rotate about a rotation center, and
said restriction portion of said first barrier blade is provided, as viewed in plan, at or outside a position passed by a circle centered on the rotation center and having a radius that has a length from the rotation center to an optical axis center of the optical lens.

7. An image pickup apparatus comprising the barrier device as set forth in claim 1.

* * * * *